United States Patent [19]
Pelstring et al.

[11] Patent Number: 6,029,978
[45] Date of Patent: Feb. 29, 2000

[54] GROUNDING AND CONDUCTIVITY IMPROVEMENT FOR FERROFLUID SEALS

[75] Inventors: Robert Michael Pelstring; John Charles Dunfield, both of Santa Cruz, Calif.

[73] Assignee: Seagate Technology, Inc., Scotts Valley, Calif.

[21] Appl. No.: 08/935,245

[22] Filed: Sep. 22, 1997

Related U.S. Application Data

[62] Division of application No. 08/718,085, Sep. 17, 1996, abandoned.

[51] Int. Cl.⁷ ............................................... F16J 15/00
[52] U.S. Cl. ............................................ 277/410; 277/409
[58] Field of Search .......................... 277/410, 302, 277/409, 411, 431

[56] References Cited

U.S. PATENT DOCUMENTS

| | | | |
|---|---|---|---|
| 4,252,328 | 2/1981 | Raj et al. | 277/1 |
| 4,357,022 | 11/1982 | Raj | 277/1 |
| 4,506,895 | 3/1985 | Raj | 277/410 |
| 4,527,802 | 7/1985 | Wilcock et al. | 277/1 |
| 4,673,997 | 6/1987 | Gowda et al. | 360/107 |
| 4,708,350 | 11/1987 | Mizumoto et al. | 277/410 |
| 4,817,964 | 4/1989 | Black, Jr. | 277/1 |
| 4,830,384 | 5/1989 | Raj et al. | 277/80 |
| 5,018,751 | 5/1991 | Raj et al. | 277/80 |
| 5,118,118 | 6/1992 | Tadi et al. | 277/80 |
| 5,161,902 | 11/1992 | Fujii | 384/446 |
| 5,267,737 | 12/1993 | Cossette et al. | 277/80 |

FOREIGN PATENT DOCUMENTS

| | | |
|---|---|---|
| 2-138519 | 5/1990 | Japan . |
| 1574966 | 6/1990 | U.S.S.R. . |

*Primary Examiner*—Daniel G. DePumpo
*Attorney, Agent, or Firm*—Flehr Hohbach Test Albritton & Herbert LLP

[57] ABSTRACT

A motor is disclosed which includes a shaft and a hub rotating relative to one another and defining a bore therebetween. Also disclosed is a magnetic fluid seal which includes pole pieces supported from the hub, the pole pieces extend toward the shaft. The pole pieces sandwich a non-conducting magnet in a space between the pole pieces. In addition, a contacting process is supported from one of the pole pieces for making electrical contact with the other pole piece to enhance electrical conductivity between the hub and shaft.

3 Claims, 5 Drawing Sheets

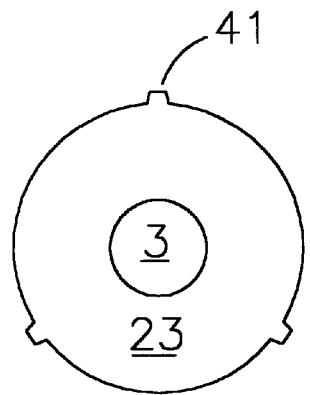 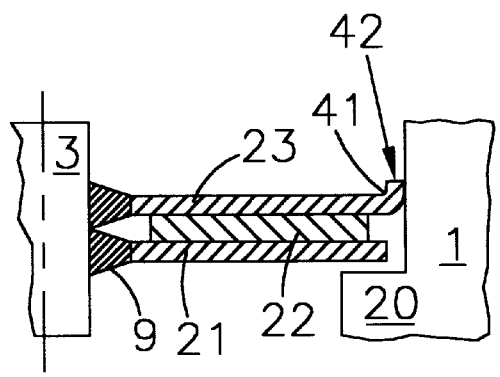
FIG. 3A  FIG. 3B
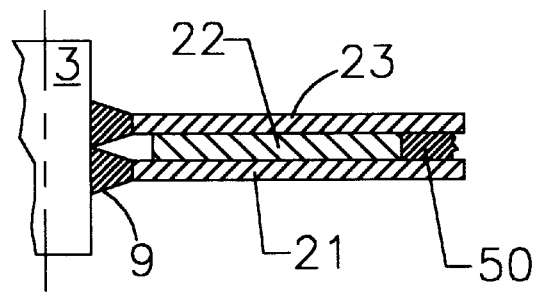
FIG. 4
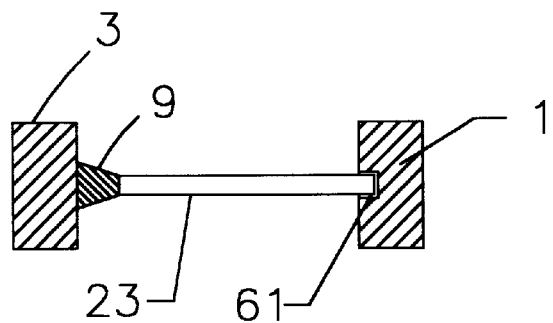
FIG. 5

GROUNDING AND CONDUCTIVITY IMPROVEMENT FOR FERROFLUID SEALS

This is a divisional of application Ser. No. 08/718,085 filed Sep. 17, 1996, now abandoned.

FIELD OF THE INVENTION

This invention is directed generally to ferrofluid seals, and more particularly to method and apparatus for electrically grounding ferrofluid seal pole pieces, typically to the hub/bearing holder assemblies.

The grounding method and apparatus disclosed herein and which forms a part of the present invention is particularly useful in a computer magnetic disc drive, but is not limited to such use.

BACKGROUND OF THE INVENTION

Winchester disk drive units having one or more rotatable memory storage disks mounted within a sealed disk drive housing along with associated electromagnetic heads for reading and writing data on appropriately prepared disk surfaces are the most common and popular form of data storage for personal computers. Within the sealed disk drive, rotating constant speed spindle motor is provided for mounting and rotating the disks. Because of the extremely fine tolerances in the internal components to the disk drive, especially the head and disk surface, the head disk assembly is sealed against outside air to prevent entry of contaminants. In order to minimize the size of the disk drive, modern spindle motors are designed with many components inside the hub which supports the disks. Therefore, obviously, it is also critical to provide a seal between the spindle motor which mounts the disks for rotation and the interior of the head disk assembly. Magnetic fluid seals have been commonly adopted in spindle motors for disk drives as a means to seal either the external components from the inside of the drive, thus preventing external contaminants such as dust particles from entering the head disk assembly; or are used to seal portions of the regions within the head disk assembly to prevent the flow of air through the motor bearings, thus preventing particles such as grease containing aerosols from circulating from the motor into the interior of the head disk assembly. Some motors have single seal and labyrinth at opposite ends of the space to be enclosed; other motors have two magnetic seals.

A typical magnetic seal is shown in a simplified form in FIG. 1, with the seal 5 being mounted between the hub or housing 1 and the shaft 3. The hub and shaft are rotating relative to one another. A pair of annular pole pieces 13 and 15 are provided, sandwiching a permanent magnet 11 which is integrally inserted between the pole pieces to form the seal of the device. A ferrofluid 9, which is electrically and magnetically conductive, e.g., CFF200A from Ferrotech, is disposed between the pole pieces 13 and 15 and the shaft 3. The magnet 11 causes the ferrofluid to be retained in place between the pole pieces 13 and 15 and the shaft 3 so that a seal is formed through which contaminants cannot pass. Now, with the adoption of magnetoresistive "MR" heads in disk drives, a related problem has been identified which requires modification of accepted magnetic seal designs. Specifically, such magnetoresistive heads are extremely sensitive to the buildup of any static electrical charge on the rotating disks, as well as to contamination. Therefore, it is extremely important that in MR head drives, the pole pieces 13, 15 need to be electrically connected to each other, or both need to be in electrical contact with the hub/bearing holder assembly so that any electrical charge buildup on the disks can be safely conducted through the pole pieces from the hub to the shaft, and then to ground while maintaining the integrity of the magnetic seal. In magnetic seal design as known in the prior art, such electrical conductivity typically is not established to the extent desired. Typically, only one of the two pole pieces is electrically in contact with the hub or bearing assembly 1. Further, the magnet 11 is typically formed of a nonelectrically conductive material, so that the electrically conducting pole pieces 13, 15 are isolated one from another by the magnet 11. Moreover, although in the diagrammatic FIG. 1, the ferrofluid seal is shown in equal amounts 9 between the pole pieces and the shaft, in fact a majority of the fluid is collected between one pole piece and the shaft, primarily as a function of the direction from which the seal was filled with the fluid. As a result, the pole piece which has the lesser amount of fluid 9 between pole piece and shaft is in very poor electrical contact with the rotating shaft. Thus, magnetic seals of present designs provide inadequate contact between the outer hub and the shaft to successfully ground out any stray electrical charge.

SUMMARY OF THE INVENTION

Therefore, it is an object of the present invention to provide an improved means for grounding the hub to the shaft in a disk drive spindle motor incorporating magnetic seals. More specifically, it is an object of this invention to provide a means for improving the conductivity of the magnetic seal so that any stray electrical charge buildup on the disks supported on the hub can be grounded to the spindle motor shaft.

A related objective of the invention is to modify the design of existing magnetic seals so that both of the pole pieces in a two pole piece magnetic seal substantially contribute to the electrical conductivity between the hub and shaft, grounding the hub to the shaft.

In summary, these and related objectives of the present invention are accomplished by providing means for establishing electrical contact between the first and second pole pieces of the magnetic seal without diminishing the effectiveness of the magnetic seal. These means for improving the electrical contact comprise providing one or more grounding tabs which establish a contact between the first and second pole pieces. Alternatively, a small electrically conductive nonmagnetic piece may be inserted adjacent the magnet between the two pole pieces.

In alternative embodiments, a conductive magnetic material or a magnet with a conductive coating may be adopted as the magnetic spacer between the pole pieces.

In a further alternative to the invention, an electrically conductive adhesive may be used to bond the pole pieces and magnet together and forming the magnetic seal.

In a further alternative embodiment, a compressible conductor having some spring like elastic qualities may be inserted in a hole or opening in the magnet, so that electrical contact is established between the adjacent pole pieces without diminishing the effectiveness of the magnetic seal.

Other features and advantages of the present invention, as well as further details of embodiments of the present invention may be understood by reviewing the following detailed description of such exemplary preferred embodiments given in conjunction with the following figures.

BRIEF DESCRIPTION OF THE DRAWINGS

FIGS. 3A and 3B are top plan and vertical sectional views of a further embodiment of the invention incorporating multiple tabs in one pole piece, which tabs interface with the hub;

FIG. 4 shows a further alternative embodiment incorporating a conductive nonmagnetic ring between the pole pieces;

FIG. 5 is an alternative view of a further embodiment of the invention incorporating a bayonet type grooves or tabs for one or more of the pole pieces;

FIG. 6A is a vertical sectional view of a further alternative embodiment incorporating a conductive ring between the pole pieces, while

DETAILED DESCRIPTION OF A PREFERRED EMBODIMENT

Figure 1:
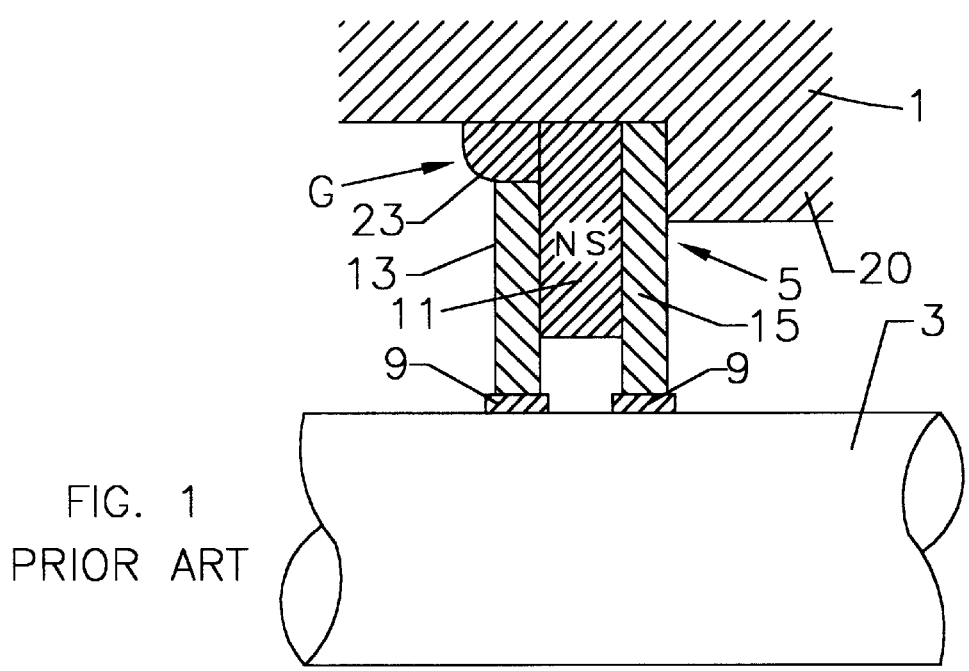
FIG. 1 is a diagrammatic view of a known magnetic seal construction shown supported between a hub and a shaft which rotate relative to one another.

A number of embodiments will be discussed below, with reference to FIGS. 2–10. Each of these embodiments will be disclosed as modifications to the description given of FIG. 1, where a magnetic seal is shown mounted between a hub 1 and shaft 3. It should be noted that the lower step region 20 of the hub which extends out toward the shaft 3 may in many embodiments comprise a portion of a bearing or a bearing holder as is well known in this technology and appears.

Figure 2A:
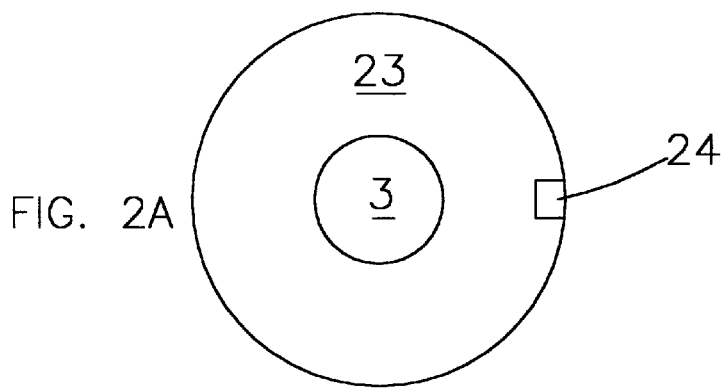
FIGS. 2A and 2B are top plan and vertical sectional views, respectively, of an embodiment of this invention incorporating one or more ground tabs on a pole piece which puts the pole piece in electrical contact with a second pole piece.
Figure 2B:
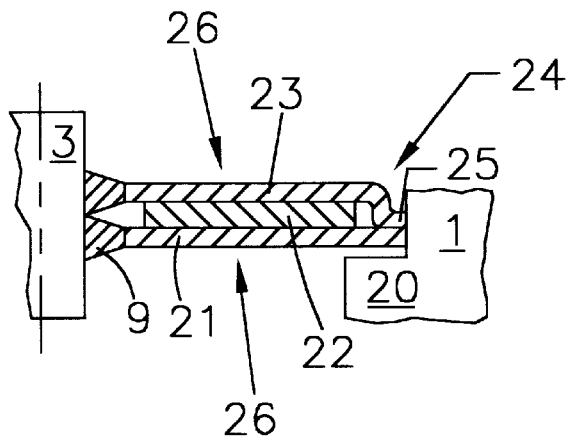

Referring first to FIGS. 2A and 2B, the embodiment of these FIGS. 2A and 2B includes a pair of pole pieces 21 and 23, separated by an insulating magnet 22 of a nonelectrically conductive material. One of the two pole pieces, preferably the one which is more distant from the bearing support or shelf 20, which in this case would be the upper pole piece 23, includes a grounding tab 24 which is of small diameter and circumference relative to the overall size of the pole piece and is typically formed along the outer circumference of the pole piece. This grounding tab is of sufficient length that when the pole piece 23 is preloaded down against the magnet 22 and first pole piece 21, the tab 24 extends across a gap established by the thickness of the magnet 22, comes into solid, electrical contact with the first pole piece 21. The pole piece preferably includes a toe portion which is long enough to rest on the opposite pole piece 21. The pole piece 23 is bonded into place with the tab preloaded against the first pole piece 21. The first pole piece 21, since it rests on the shelf or bearing holder 20, is in fixed electrical contact with the hub 1. Therefore, a meaningful electrical contact so that grounding occurs through both pole pieces has now been established from the hub, through the pole pieces 21, 23, and the fluid 9, to the shaft 3. The bias or preload force represented by the arrow 26 is established by the bonding of the top pole piece 23 to the magnet 22, thereby holding the grounding tab 24 in contact with the lower pole piece 21. Alternatively, the electrical contact could be enhanced by utilizing a plurality of grounding tabs supported on the first pole piece and contacting the second, as described above.

A further embodiment is shown in FIGS. 3A and 3B. In this instance, a plurality of grounding tabs 41 are spaced around the outer edge of the upper pole piece 23. These tabs 41 are each of sufficient length that, as shown diagrammatically in FIG. 3B, they form a toe portion 42 and extend along the wall of the hub 1. In this way, the electrical contact of the pole piece is not just the end of the pole piece but is substantially exaggerated, thereby optimizing the electrical contact between the tab, and the pole piece 23, and the hub 1. Typically these tabs 41 are regularly spaced around the pole piece's outer circumference.

It can be seen that in this embodiment as illustrated particularly in FIG. 3B that the grounding tabs are attached to or integrated into only the upper pole piece 23. The lower pole piece 21 is presumably effectively grounded by virtue of the fact that it rests on the shelf 20. However, the same grounding tabs 41 could also be added to the second pole piece 21 so that effective grounding of the pole piece 21 against the side of the hub is guaranteed.

Referring back to the embodiments of FIGS. 2A and 2B, the width of the tabs must be limited, typically no more than a quarter of an inch, so that no adverse effects, such as shorting out of the magnetic field created by the magnets supported between the two pole pieces occurs by virtue of provision of the grounding tabs.

Turning to the next embodiment, that of FIG. 4, this embodiment shows a nonmagnetic ring 50 which preferably lies just outside the magnetic ring 22 and extends some reasonable distance around the circumference of the pole pieces 21 and 23. As can be seen from a review of FIGS. 2 and 3, this ring does not need to extend entirely around the circumference, but only a sufficient difference to provide substantial electrical conductivity between the pole pieces 21 and 23. This ring may be held or bonded in place, and may alternatively go around the inside inner circumference of the pole pieces rather than the outer circumferential region of the pole pieces. With the outer circumference being substantially preferable for creating the electrical conductivity from pole to pole.

Referring next to FIG. 5, this illustrates a method of mounting the poles or pole pieces 21, 23 in the hub/bearing holder 1 in a manner which will substantially increase the conductivity between the pole pieces and the hub. Specifically, according to this approach, at least one and preferably both of the pole pieces 21, 23 are inserted in bayonet style into grooves into the hubs. These grooves 61, 62 receive the ends of the pole pieces and support them in the hub so that no bearing or extension piece 20 is needed to support the pole pieces.

Figure 6B:
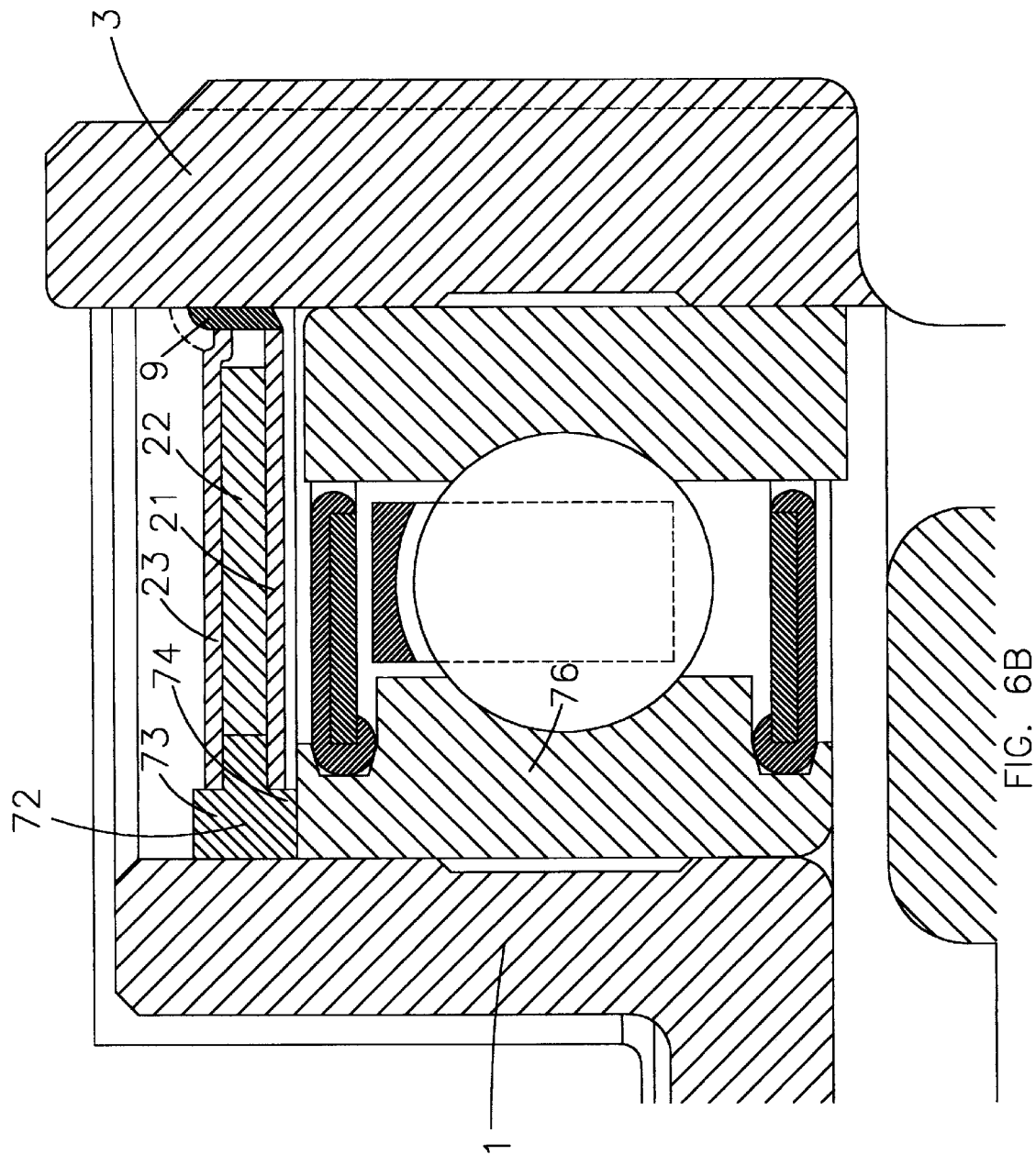
FIG. 6B illustrates the incorporation of the magnetic seal assembly into a motor assembly and its position relative to a mechanical bearing, the shaft and hub of the motor.
Figure 6A:
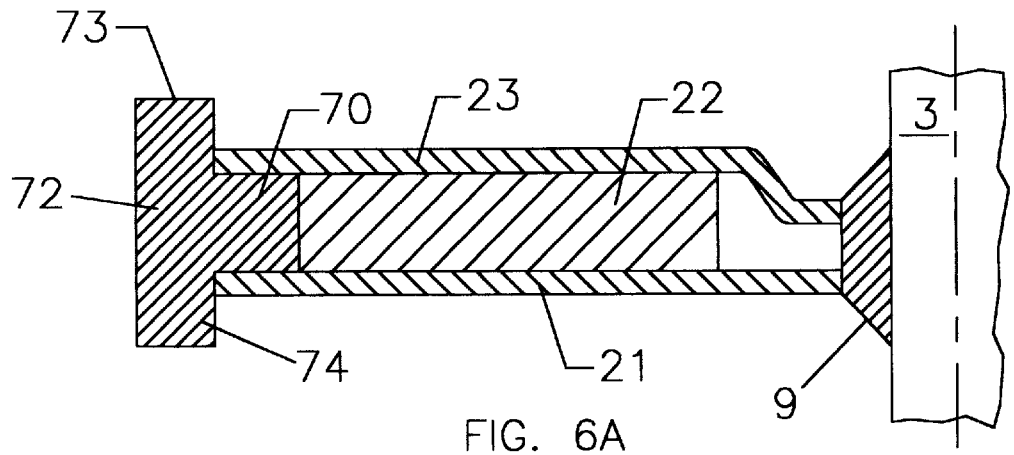

Referring next to FIGS. 6A and 6B, this embodiment comprises a further improvement over the design of FIG. 4, which incorporated a conductive nonmagnetic ring extending circumferentially around the magnet. The embodiment of FIGS. 6A and 6B incorporates with the conductive nonmagnetic ring 70, a shoulder piece 72 having axial extensions 73, 74 extending a sufficient length to extend above and below the pole pieces 21, 23. This ring 70 does not need to extend entirely around the circumference of the magnet but only a sufficient distance to provide substantial electrical conductivity between pole pieces 21 and 23. By providing these extensions or shoulders 73, 74 the conductive ring 70 provides the necessary conductive contact between the pole pieces, through the extension 72 to the hub 1. Further, conductive ring 70 axially locates the magnetic seal relative to the bearing, which is shown in FIG. 6B. This eliminates the need for a spacer ring which is usually provided between the bearing 76 and the magnetic seal. Further, the use of the conductive ring 70, 72 adds structural rigidity and thermal stability to an otherwise spongy assembly which comprises the conventional ferrofluidic seal. The ferrofluidic seal is generally of softer spongy construction because it comprises a soft magnet 22 and thin sheet metal pole pieces 21 and 23. The conductive nonmagnetic ring shaped piece 70, 72, though referred to by two separate numbers, is typically an integral ring. This establishes pole to pole conductivity, structural stiffness, thermal stability, and positioning of the magnetic seal in both radial and axial directions.

Figure 7:
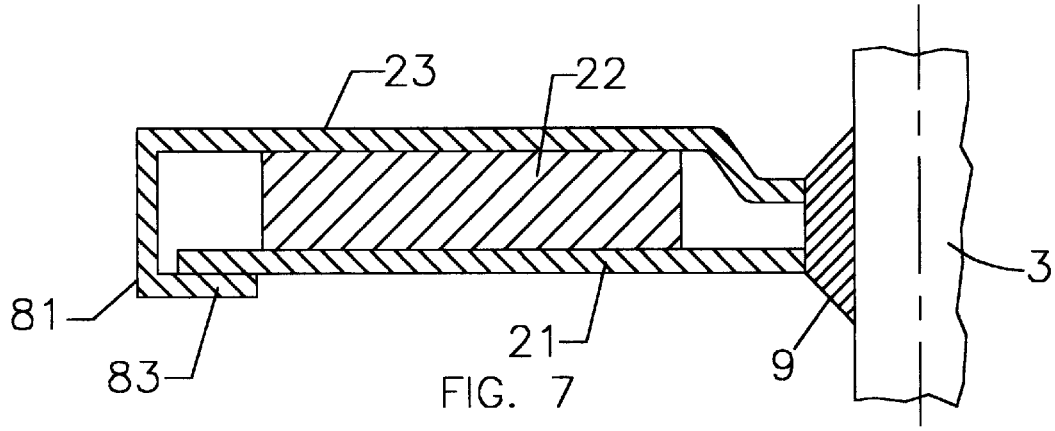
FIG. 7 is a vertical sectional view of a further alternative embodiment incorporating a conductive tab to create contact between the pole pieces.

Turning next to FIG. 7, this design is basically a modification of the approach shown in FIG. 2, which discloses tabs 41 which are mounted to or integrated with the pole piece and extend the length of the pole piece. According to this design, a similar tab 81 is mounted on one of the pole pieces or integrated with one of the pole pieces, preferably the upper pole piece and extended long enough to extend across the gap between the pole pieces and includes a finger region 83 which abuts the lower pole piece 21. In this way, substantial electrical contact is established between the upper pole piece 23 and the lower pole piece 21, with the entire unit being integrated by bonding of the three pieces, comprising the two pole pieces and the magnet. This tab 81 thus provides pole to pole conductivity and structural and thermal stability. It can be mounted similar to the earlier design shown, and in fact, could be substituted for the magnetic seal shown at numeral 5 in FIG. 1 being mounted on a shelf with adhesive.

Figure 8:
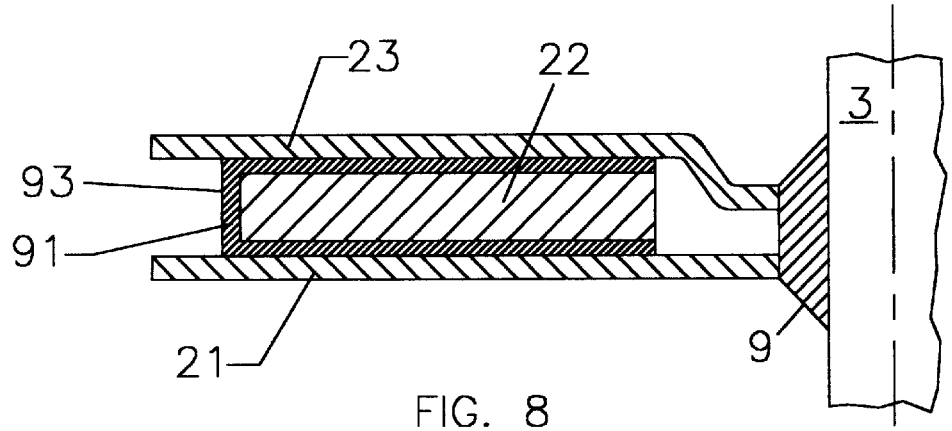
FIG. 8 is a vertical sectional view of an eighth alternative embodiment incorporating modifications to the magnetic material to improve electrical conductivity.

FIG. 8, illustrates a modification wherein a coating 91 is illustrated extending at least partially over the surface of the magnet, especially the surfaces facing the upper pole piece 23 and the lower pole piece 21 and across at least one side 93 of the end of the magnet. In this way, continuous conductive film is established over the pole pieces, so that this conductive coating, which may be a material such as nickel, provides the necessary pole to pole conductivity to provide adequate grounding of the hub and therefore discharge of the static charge on the disk. A further, although substantially more expensive alternative to the embodiment of FIG. 8 would be to substitute a magnet made of a conductive material.

Figure 9:
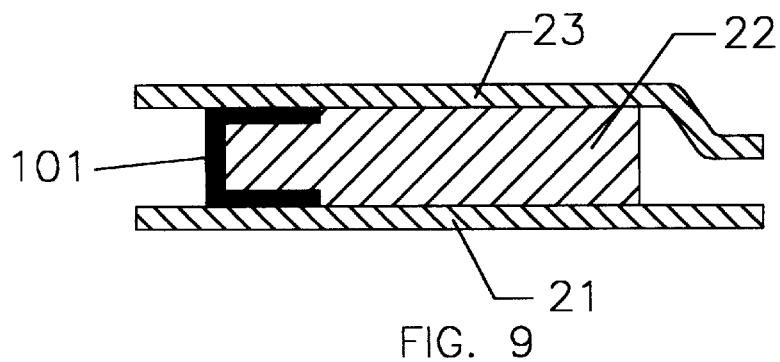
FIG. 9 is a vertical sectional view of a ninth embodiment incorporating conductive adhesive to establish electrical contact between the pole pieces.

FIG. 9 is in effect, an alternative embodiment to FIG. 8, in that it suggests use of a conductive adhesive incorporated in the assembly process. That is, the adhesive is placed over at least part of the magnet 22 surfaces which face the upper pole 23 and the lower pole 21, the adhesive replacing at least part of or supplementing at least part of the adhesive which normally bonds the magnetic seal together. The adhesive must also include a region 101 which extends over the end or side of the magnet so that the conductive circuit is completed between the upper and lower pole pieces. A typical conductive adhesive presently known in the technology would be a silver filled epoxy; obviously, other materials are readily available, and may be chosen both for their conductivity, ease of application, and cost.

Figure 10A:
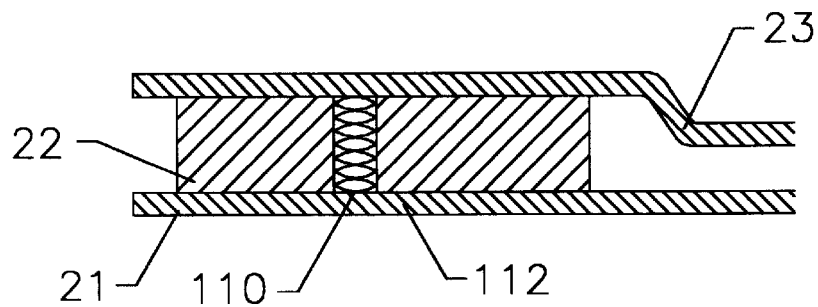
FIGS. 10A, 10B, 10C and 10D are vertical sectional views, and in 10D, a top plan view of alternative embodiments incorporating compressible conductors in the magnet to establish electrical contact between the pole pieces.
Figures 10B, 10C:
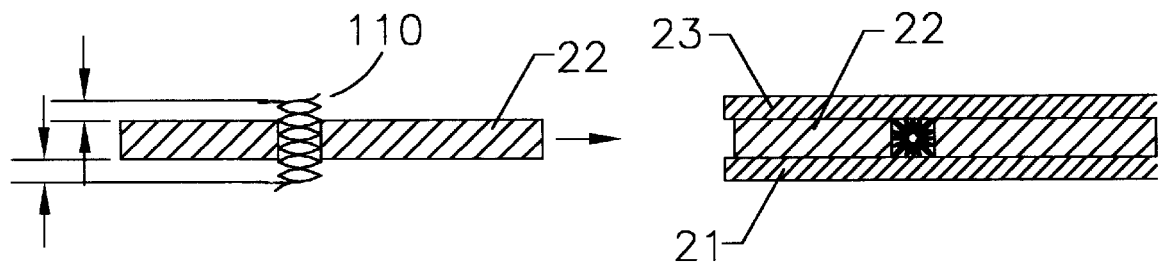
Figure 10D:
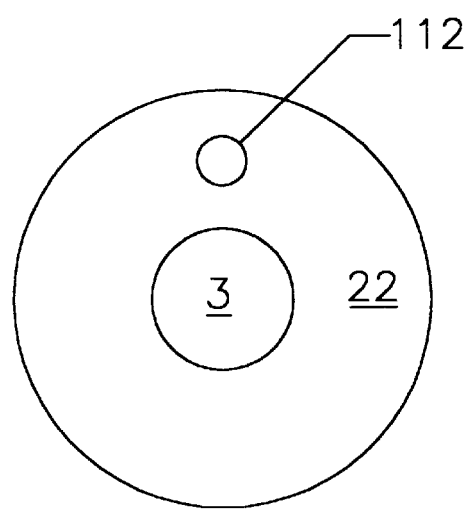

A further approach to the present invention is shown in FIGS. 10A–10D, and incorporates the use of a compressible conductor 110 having a substantial resiliency which extends preferably through a hole or opening 112, defining an axial bore, in the magnet 22. It thereby comes in contact with both the pole pieces 21, and 23; the conductivity is enhanced by the fact that the conductor is a spring type element, such as a spring or "fuzzball" 110 of a random mixture of a plurality of intermingled electrically conductive string like elements which has some compressibility and elastic resiliency, shown in FIG. 10C. The use of such a conductor in an opening 112 within the magnet allows the conductor to be constrained within the magnet so that it does not escape from its proper positioning in contact with both the upper 23 and lower 21 pole plates. Further, the use of such a conductor does not interfere with or short circuit the magnetic field which is being established by the magnet 22. The assembly is achieved simply by providing a hole 112 in one or more regions of the magnet as shown in FIG. 10D. The conductor would initially extend at least partly beyond the upper and lower surface of the magnet 22 as shown in FIG. 10B. The pole plates 21, 23 are then pressed in place and bonded in place to form the finished assembly.

Other features and advantages of the present invention may become apparent to a person of skill in the art who studies the present invention disclosures. Therefore, the scope of the present invention is to be limited only by the following claims.

We claim:

1. A magnetic fluid seal for use in a motor, said motor having a shaft and a hub rotating relative to one another, and defining a bearing therebetween, said magnetic fluid seal comprising:

first and second pole pieces supported from said hub and extending toward said shaft, said pole pieces sandwiching a non-electrically conductive magnet in the space between said pole pieces, and contacting means for establishing electrical contact between said first and second pole pieces comprising:
a compressible electrical conductor held in place in an axial bore extending through said magnet from said first pole piece to said second pole piece, said compressible electrical conductor thereby remaining in contact with said first and second pole pieces.

2. A magnetic fluid seal as claimed in claim 1 wherein said compressible electrical conductor is a spring conductor having a substantial resiliency to remain in contact with said first and second pole pieces.

3. A magnetic fluid seal as claimed in claim 1 wherein said compressible electrical conductor comprises a random fuzzball conductor having random wires, said random wires inherently having an elastic resiliency to remain compressed between said first and second pole pieces and maintains electrical contact and electrical conductivity between said first and second pole pieces.

\* \* \* \* \*